United States Patent [19]

Knopf et al.

[11] Patent Number: 4,528,334

[45] Date of Patent: Jul. 9, 1985

[54] CARBOXYLATED POLY(OXYALKYLENES)

[75] Inventors: Robert J. Knopf, St. Albans; Kenneth Drake, Charleston, both of W. Va.

[73] Assignee: Union Carbide Corporation, Danbury, Conn.

[21] Appl. No.: 605,559

[22] Filed: Apr. 30, 1984

Related U.S. Application Data

[63] Continuation-in-part of Ser. No. 307,229, Sep. 30, 1981, abandoned, which is a continuation-in-part of Ser. No. 234,094, Feb. 12, 1981, abandoned, which is a continuation of Ser. No. 963,408, Nov. 24, 1978, abandoned.

[51] Int. Cl.$^3$ ............................................. C08F 283/06
[52] U.S. Cl. .................................... 525/404; 525/187; 525/529; 525/531
[58] Field of Search ................ 525/404, 531, 529, 187

[56] References Cited

U.S. PATENT DOCUMENTS

| | | | |
|---|---|---|---|
| 3,418,354 | 12/1968 | Wheeler, Jr. ........................ | 525/479 |
| 3,546,321 | 12/1970 | Jabloner et al. .................... | 525/398 |
| 3,950,317 | 4/1976 | Patton, Jr. et al. ................. | 525/404 |
| 3,963,805 | 6/1976 | Chu .................................... | 525/404 |

*Primary Examiner*—Theodore E. Pertilla
*Attorney, Agent, or Firm*—Norman L. Balmer

[57] ABSTRACT

Graft copolymers are obtained which are substantially free of insoluble homopolymers by grafting 3 to 15 percent by weight of acrylic acid onto poly(oxyalkylene) compounds.

11 Claims, No Drawings

CARBOXYLATED POLY(OXYALKYLENES)

This application is a continuation-in-part of application Ser. No. 307,229, filed Sept. 30, 1981, now abandoned, which is a continuation-in-part of application Ser. No. 234,094, filed Feb. 12, 1981, now abandoned, which was a continuation of application Ser. No. 963,408, filed Nov. 24, 1978, now abandoned, all of which are herein incorporated by reference.

This invention pertains to graft copolymers and, more particularly, to graft copolymers prepared by having acrylic acid grafted onto poly(oxyalkylene) compounds. These graft copolymers can be prepared in the presence of tertiary butyl perbenzoate, di-tertiary butyl peroxide, or tertiary butyl hydroperoxide.

Poly(oxyalkylene) compounds including poly(oxyethylenes), poly(oxypropylenes) and copolymers thereof have many and diverse industrial uses including being used for a variety of applications as lubricants. However, when used in aqueous formulations, particularly in combination with other ingredients, such compounds often separate and/or settle out on standing, which is generally undesirable in process operations. There is a need, therefore, for modified poly(oxyalkylene) compounds which possess many or all of the properties of the unmodified compounds plus new or improved physical and/or chemical properties.

Techniques for producing copolymers by graft polymerizing ethylenically unsaturated monomers onto polymer backbones are, in general, well known. However, the resultant graft copolymers are often seriously contaminated with by-products resulting from undesired side reactions, one common contaminant being homopolymers of the monomer used in the graft polymerization reaction.

A process for preparing graft copolymers of poly(oxyalkylene) compounds with a wide variety of readily polymerizable olefins which is reported to substantially reduce the formation of insoluble homopolymer by-products, is disclosed, for example, in U.S. Pat. No. 3,418,354 to Wheeler, Jr. The method of this patent generally involves preparing an admixture of an olefin and a catalytic amount of a peroxide containing a peroxide group linked to a tertiary carbon atom and slowly adding said mixture to a poly(oxyalkylene) compound which is maintained at a temperature high enough to cause the grafting reaction to occur. Among the wide variety of olefinic compounds which are suggested as being applicable for use in the grafting reaction of the invention disclosed by Wheeler, Jr., are included unsaturated aliphatic acids such as acrylic acid and methacrylic acid, but neither of these materials were employed in the examples of the patent. Methods disclosed in the patent for preparing graft copolymers of poly(oxyalkylene) compounds, however, are not generally suitable for use with acrylic acid monomer, particularly in large scale or commercial operations. The difficulties and potential danger that would be encountered in processing and storing mixtures of acrylic acid and peroxide catalysts are well known and seriously limit the acceptability of the use thereof. Moreover, mixing of the grafting catalyst and monomer reactants prior to adding such reactants to the poly(oxyalkylene) compound generally results in the formation of product mixtures containing excessive amounts of insoluble homopolymer and significant variations in the properties of the copolymers that are prepared.

Further, in U.S. Pat. No. 3,546,321 to Vandenberg, et al., is also disclosed a method for preparing graft copolymers of polyether polymers and monomers containing ethylene unsaturation. In the process of the invention, polyether polymers having a hydrogen attached to a carbon atom alpha to an ether oxygen in the polymer backbone are first contacted with oxygen in the presence of an initiator agent to form the hydroperoxide thereof. Graft copolymers are then prepared from the polyether hydroperoxides by polymerizing one or more vinylidene monomers by free radical mechanism at free radical sites on the polyether main chain created by decomposition of the hydroperoxy groups. While the process invention of the patent is shown to prepare graft copolymers of polyether polymers, the grafter polyether copolymer products are generally shown to be solids and the process involves a two stage process which may be more complex than desired for a number of applications.

SUMMARY OF THE INVENTION

In accordance with the present invention graft copolymers of acrylic acid and a poly(oxalkylene) have been prepared by a method which comprises adding in separate feed streams from about 3 percent by weight, based on the weight of the total charge, of acrylic acid generally in a mixture with the poly(oxyalkylene), and a catalytic amount of t-butyl perbenzoate, di-t-butyl peroxide or t-butyl hydroperoxide generally in a solution of poly(oxyalkylene) to an agitated bath of poly(oxyalkylene), whereby all of said components are intimately admixed, at a temperature of about 100° C. to about 160° C. and maintaining said temperature until a graft copolymer of acrylic acid on poly(oxyalkylene) is obtained, said poly(oxyalkylene) having the formula $$R''[(OC_nH_{2n})_zOR']_a$$

wherein $R''$ is a hydrocarbon radical containing up to 10 carbon atoms which is free of aliphatic unsaturation and has a valence of a, a is an integer having a value of 1 to about 4, $R'$ is a hydrogen atom or a monovalent hydrocarbon radical containing up to 6 carbons which is free of aliphatic unsaturation, n has a value of 2 to 4 inclusive, and z is an integer having a value of about 8 to about 800.

It has also been discovered that homogeneous graft copolymers are prepared in accordance with the practice of the invention which are, surprisingly, substantially free of insoluble homopolymerized acrylic acid (contains less than 1% by weight of said insoluble homopolymer) even when prepared in large scale or commercial operations. Moreover, such graft copolymers, which are generally liquids exhibit desirable viscosities even when up to 15 percent by weight of acrylic acid is grafted onto the poly(oxyalkylene) compound, and certain modified properties which enhance the suitability thereof for a number of applications.

DESCRIPTION OF THE INVENTION

Graft copolymers of acrylic acid and a poly(oxyalkylene) of the present invention are prepared by a method which comprises separately adding acrylic acid and a catalytic amount of di-t-butyl perbenzoate, t-butyl peroxide, or t-butyl hydroperoxide to an agitated bath of the poly(oxyalkylene), whereby all of said components are intimately admixed at a temperature of from about 100° C. to about 160° C. and maintaining said temperature until a graft copolymer of acrylic acid on poly(oxyalylene) is obtained. The catalyst and/or acrylic acid reactants which are to be added to the poly(oxyalkylene) in the reaction zone may be mixed with a portion of the poly(oxalkylene) prior to feeding to the reaction zone.

The poly(oxyalkylene) compounds used to make the graft copolymers of the invention are known in the art and have the formula

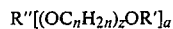

$$R''[(OC_nH_{2n})_zOR']_a$$

wherein R″ is a hydrocarbon radical containing up to 10 carbon atoms which is free of aliphatic unsaturation and has a valence of a, a is an integer having a value of 1 to about 4, R′ is a hydrogen atom or a monovalent hydrocarbon radical containing up to 6 carbon atoms which is free of aliphatic unsaturation, n has a value of 2 to 4 inclusive, and z is an integer having a value of about 8 to about 800.

In general, these compounds contain either oxyethylene or oxypropylene groups or both oxyethylene groups and higher oxyalkylene groups such as oxypropylene and oxybutylene groups, either in random or block distribution in their molecules, and have molecular weights(number average) in the range of about 400 to about 35,000, and, preferably, in the range of about 1500 to about 4000. These poly(oxyalkylene) compounds may be made by processes well known in the art by reacting an alkylene oxide or mixtures of alkylene oxides with a compound having from one up to as many as four active hydrogen atoms, such as water, monohydroxylic alcohols such as ethanol and propanol, dihydroxylic alcohols such as ethylene glycol and monoethyl ether of glycerine, trihydroxylic alcohols such as glycerine and trimethylolpropane, tetrahydroxylic alcohols such as pentaerythritol, hexahydroxylic alcohols such as sorbitol. The poly(oxyalkylene) products of such reactions will have linear or branched oxyalkylene or oxyethylene-higher oxalkylene chains, and such chains will terminate with hydroxyl groups. Some or all of these hydroxyl groups may be etherified by reaction with a dialkyl sulfate such as diethyl sulfate.

The choice of free radical initiator (graft copolymerization catalyst) for use in the process of the invention is critical. Thus while t-butyl perbenzoate, di-t-butyl peroxide, or t-butyl hydroperoxide afford the desired homogeneous graft copolymers, azobisisobutyronitrile does not, leading instead to heterogeneous product mixtures.

It has been unexpectedly found that homogeneous graft copolymers can be obtained by the process of the present invention which are substantially free (contains less than 1 percent by weight) of insoluble homopolymerized acrylic acid by charging, preferably in gradual and/or incremental amounts, the reactants in two separate feed streams, one of which consists of the acrylic acid grafting monomer generally mixed with the poly(oxyalkylene) compound and a second consisting of the free radical polymerization initiator, also generally mixed with poly(oxyalkylene) compound. It is not essential that either of the reactants be mixed with the poly(oxyalkylene) compound prior to feeding them to the reaction zone but doing so may facilitate the gradual or incremental feeding thereof of the reaction mixture. The amount of acrylic acid monomer added to the polymerization reactor zone is important and should be, in general, limited to an amount from about 3 percent by weight up to about 15 percent by weight, based on the total weight of poly(oxyalkylene) compound charged.

Although polymerization temperatures of from about 100° C. to about 160° C. can be used in the graft polymerization reaction, it is preferred to use temperatures in the range from about 130° C. to about 150° C. Polymerization temperatures above 160° C. lead to the formation of undesirable by-products and should be avoided.

Incremental and/or gradual addition of the two separate reactant feed streams coupled with efficient agitation of the poly(oxyalkylene) compound in the polymerization zone which is maintained at the aforesaid graft polymerization reaction temperature constitutes the most important technique for producing the graft copolymers substantially free of homopolymerized acrylic acid monomer. It has been found that this method is essential in large scale or commercial operations, not only for preparing the desired homogeneous graft copolymer, but also to enable the readily homopolymerizable acrylic acid monomer and the free radical initiator to be suitably processed and stored prior to their addition to the reaction mixture.

Unexpectedly, it was also found that methacrylic acid did not graft well to the poly(oxyalkylene) compounds, producing an undesirable heterogeneous mixture containing homopolymer of the methacrylic acid monomer.

The graft copolymerization reaction of the invention is preferably carried out in bulk without the use of an organic solvent. If desired, however, a solvent may be used which is non-reactive and inert to the reactants. Suitable organic solvents include aromatics, such as, benzene or tertiary-butylbenzene; aliphatics, such as heptane, hexane, or octane, and mixtures thereof.

The graft copolymers of this invention provide poly(oxyalkylene) copolymers which are substantially free of insoluble homopolymerized acrylic acid that have modified and improved solubility and solution properties which render them useful as lubricants for metals, paper, textiles and the like. Moreover, such liquid copolymers exhibit generally uniform and usable viscosities even when prepared with up to 15 percent by weight of grafted acrylic acid.

This invention is further described in the Examples which follow. All parts and percentages are by weight unless otherwise specified.

EXAMPLE 1

An initial charge (640 g.) of a butanol-started ethylene oxide/propylene oxide (50/50 by weight) poly(alkylene oxide) having a viscosity of 5100 SUS (seconds Universal Saybolt) was placed in a 2-liter resin kettle equipped with a stirrer, two 250-ml. dropping funnels, a reflux condenser, a thermometer and a thermoregulator. Two 4-bladed, 45°. tilted, turbine impellers were mounted on a stirrer shaft; one positioned near the top of the liquid level and the other at the bottom of the kettle. Stirring was maintained at a rate sufficient to produce a good vortex. The two dropping funnels were positioned to deliver their contents above the liquid level of the reaction mixture, at opposite sides of the resin kettle. Both feeds from the funnels were adjusted to drop directly into the resin kettle, not down the walls.

The initial charge of poly(oxyalkylene) was brought to a temperature of 150° C. with stirring. One dropping funnel was used to add a feed of a mixture of 130 g. of the poly(oxyalkylene) described above and 50 g. of acrylic acid gradually, dropwise over a period of 1.5 hours. The other dropping funnel was used to add a feed of 180 g. of the poly(oxyalkylene) described above containing dissolved therein 2.5 g. of t-butyl perbonzoate also dropwise over a period of 1.5 hours. A post heat treatment also at 150° C. was given to the stirred reactants for 1.0 hour. The hot product was transferred to a tared, 5-liter flask, where it was stripped with a rotary evaporator for 2.0 hours at 100° C. at a vacuum of about 2 mm. Hg. The stripped product had an acid number of 35.26 (mg. of KOH required to neutralize one gram of sample). This corresponds to an acrylic acid content of 4.53% in the graft copolymer determined by the equation:

$$\% \text{ Acrylic Acid} = \frac{(\text{Acid Number}) (0.1) (72.06)}{56.1}$$

The graft copolymer obtained was colorless, clear, and had a Brookfield Viscosity of 2600 cps at both 60 rpm and 6 rpm.

EXAMPLE 2

Example 1 was repeated with the exception that the charge contained 3% by weight of acrylic acid instead of 5%. The resultant copolymer was colorless, and clear, and contained 2.72% acrylic acid grafter thereon. The Brookfield Viscosity was 2400 cps at 60 rpm and 2300 cps at 6 rpm.

EXAMPLE 3

Example 1 was repeated with the exception that the charge contained 8% by weight of acrylic acid instead of 5% with an initial charge of 670 grams of the poly(oxyalkylene) being used and the acrylic acid feed consisting of 80 grams of acrylic acid and 100 grams of the poly(oxyalkylene). The resultant copolymer was colorless and clear and contained 7.1% acrylic acid grafted thereon. The Brookfield Viscosity was 4800 cps at 60 rpm and 4500 cps at 6 rpm.

EXAMPLE 4

Example 1 was repeated with the exception that the charge contained 10% by weight of acrylic acid instead of 5% acrylic acid with an initial charge of 690 grams of poly(oxyalkylene) being used and the acrylic acid feed consisting of 100 grams of acrylic acid and 80 grams of the poly(oxyalkylene). The resultant copolymer was faintly yellow, clear and contained 8.81% acrylic acid grafted thereon. The Brookfield Viscosity was 7600 cps at 60 rpm and 7000 cps at 6 rpm.

EXAMPLE 5

Example 1 was repeated with the exception that the charge contained 12.5 percent by weight of acrylic acid with an initial charge of 645 grams of the poly(oxyalkylene) being used and the acrylic acid feed consisting of 125 grams of acrylic acid and 125 grams of the poly(oxyalkylene). The resultant copolymer was faintly yellow, with a slight haze and contained 10.73% by weight of acrylic acid grafted thereon. The Brookfield Viscosity was 10,000 cps at 60 rpm and 61,000 cps at 6 rpm.

Control A

Example 1 was repeated with the exception that the charge contained 20.0% by weight of acrylic acid. The resultant copolymer was faintly yellow, opaque and contained 18.3% polymerized acrylic acid. The Brookfield Viscosity was 100,000 cps at 6 rpm and unmeasurable at 60 rpm.

Control B

Example 1 was repeated with the exception that the charge contained 5% by weight of methacrylic acid instead of 5% acrylic acid. The resultant product was white, opaque and indicated the presence of 4.00% polymerized methacrylic acid. The Brookfield Viscosity was 6600 cps at 60 rpm and 9600 cps at 6 rpm.

EXAMPLE 7

Example 1 was repeated with the exception that the poly(oxyalkylene) was a solid, waxy polyethylene oxide (glycol started) having a molecular weight of about 7000. The resultant product was also a yellow wax containing 4.5% acrylic acid grafted thereon.

EXAMPLE 8

Example 1 was repeated with the exception that the poly(oxyalkylene) was a glycerine started poly(ethylene oxide) having a molecular weight of 1000. The resultant product was a clear yellow liquid containing 3.84% acrylic acid grafted thereon having a Brookfield Viscosity of 550 cps at 60 rpm and 510 cps at 6 rpm.

EXAMPLE 9

Example 1 was repeated with the exception that the poly(oxyalkylene) was a glycol started ethylene oxide/propylene oxide copolymer (75/25 weight ratio) having a molecular weight of 2500. The resultant product was a clear yellow liquid containing 4.46% acrylic acid grafted thereon having a Brookfield Viscosity of 1040 cps at 60 rpm and 970 cps at 6 rpm.

EXAMPLE 10

Example 1 was repeated with the exception that the poly(oxyalkylene) was a glycol started ethylene oxide/propylene oxide copolymer (75/25 weight ratio) having a molecular weight of 2500 and the charge contained 15% acrylic acid. The resultant product was a clear yellow liquid containing 12.52% acrylic acid grafted thereon having a Brookfield Viscosity of 8000 cps at 60 rpm and 6700 cps at 6 rpm.

EXAMPLE 11

Example 1 was repeated with the exception that the poly(oxyalkylene) was an ethylene oxide/propylene oxide copolymer (75/25 weight ratio) having a molecular weight of 980 and the charge contained 10% of acrylic acid added as described in Example 4. The resultant graft copolymer was a colorless clear liquid containing 7.93% acrylic acid having a Brookfield Viscosity of 310 cps at 60 rpm and 290 cps at 6 rpm.

EXAMPLE 12

Example 1 was repeated with the exception that the poly(oxyalkylene) was a glycerine started ethylene oxide/propylene oxide copolymer (25/75 weight ratio) having a molecular weight of 3800. The resultant product was yellow and cloudy, contained 4.4% polymerized acrylic acid and had a Brookfield Viscosity of 1280 cps at 60 rpm and 1210 cps at 6 rpm.

EXAMPLE 13

Example 1 was repeated with the exception that the poly(oxyalkylene) was propylene oxide (butanol started) having a molecular weight of 2400. The resultant graft copolymer was colorless and clear, contained 4.27% acrylic acid and had a Brookfield Viscosity of 2400 cps at 60 rpm and 2100 cps at 6 rpm.

EXAMPLE 14

Example 1 was repeated with the exception that di-t-butyl peroxide was used in place of t-butyl perbenzoate and 3% acrylic acid was used in the charge. A water white graft copolymer was obtained.

EXAMPLE 15

A 450 ml stainless steel Parr Bomb "mini-reactor" equipped with a stirrer and thermoregulator and fitted with vacuum and pressure venting means was used in this example. The "mini reactor" was separately connected to two stainless steel feed reservoirs having metering valves for controlling the flow of the reactants to the reactor. Using the poly(oxyalkylene) compound of Example 1 a series of experiments was run in the reactor described above using varying proportions of reactant feed mixtures and processing conditions. The initiator used in each of the runs of this example was t-butyl perbenzoate and the reaction temperature of all the runs was 150° C. The proportion of reactants, procedures for adding reactants and results obtained from each of the runs are summarized in Table I.

and then heated 190° C. and held at that temperature while sparging with nitrogen for 30 minutes. The Brookfield Viscosity was 3380 cps at 60 rpm and 3200 cps at 6 rpm. A medium brown, clear, homogenous, viscous liguid was obtained which, when reacted with triethanolamine and used in contact with steel, was found to cause rapid and excessive amounts of corrosion. In comparison thereto, a graft copolymer was prepared using the procedure of the present invention and reacted with triethanolamine was found to inhibit corrosion of metal indicating that the material prepared according to this control was different than a graft copolymer prepared by the process of the invention.

EXAMPLE 17

This experiment demonstrates the handling and storage characteristics of reactant feed mixtures. In this example the poly(oxyalkylene) of example 1 was used along with di-t-butyl peroxide or t-butyl perbenzoate as the initiator. Feed mixture compositions having the following proportion of ingredients were evaluated.

|  | Composition #1 | Composition #2 | Composition #3 |
|---|---|---|---|
| Feed #1 |  |  |  |
| Poly(oxyalkylene) | 80 | 450 | — |
| acrylic acid | 100 | 100 | 100 |
| di-t-butyl peroxide | — | 10 | 10 |
| Feed #2 |  |  |  |
| Poly(oxyalkylene) | 50. | — | — |
| t-butyl perbenzoate | 2.5 | — | — |

TABLE I

| Run # | Initial Charge Poly (oxyalkylene) (gms) | Time (min) | Acrylic Acid (gms)/ Polymer (gms) | Initiator (gms)/ Polymer (gms) | Initiator in Field % | % Acrylic Acid Grafted | Final Viscosity Cps at 25° C. | Product Appearance |
|---|---|---|---|---|---|---|---|---|
| 1 | 200 | 246 | 30/20 | .8/43.2 | 1.8 | 9.8 | 6,100 | white ppt |
| 2 | 50 | 114 | 30/170 | 2.7/47/3 | 5.4 | 10.8 | 5,100 |  |
| 3 | 50 | 94 | 30/170 | 2.7/47/3 | 5.4 | 10.8 | 7,900 | cloudy |
| 4 | 50 | 99 | 30/170 | 2.7/47.3 | 5.4 | 10.6 | 7,100 | clear |
| 5 | 50 | 102 | 30/170 | 2.7/47.3 | 5.4 | 10.7 | 8,000 | clear |
| 6 | 200 | 88 | 30/20 | 2.7/47.3 | 5.4 | 12.1 | 5,600 | clear |
| 7 | 200 | 161 | 30/20 | 2.7/47.3 | 5.4 | 12.2 | 6,400 | clear |
| 8 | 200 | 158 | 30/20 | 0.9/49.1 | 1.8 | 11.4 | 6,900 | clear |
| 9 | 210 | 150 | 30/10 | 0.9/49.1 | 1.8 | 10 | 5,100 | cloudy |
| 10 | 220 | 154 | 30/0 | 0.9/49.1 | 1.8 | 10 | 7,600 | cloudy |
| 11 | 220 | 154 | 30/0 | 0.9/49.1 | 1.8 | 12.3 | 9,400 | clear |
| 12 | 220 | 155 | 30/0 | 0.9/49.1 | 1.8 | 10.2 | 5,800 | clear 1,000 RPM |
| 13 | 200 | 127 | 30/20 | 0.9/49.1 | 1.8 | 10.2 | 7,600 | clear |
| 14 | 220 | 165 | 30/0 | 0.9/49.1 | 1.8 | 10 | 6,700 | clear |
| 15 | 220 | 145 | 30/0 | 2.7/47.3 | 5.4 | 10 | 4,400 | clear |
| 16 | 220 | 176 | 30/0 | 2.7/47.3 | 5.4 | 10 | 3,800 | clear |
| 17 | 220 | 236 | 30/0 | 2.7/47.3 | 5.4 | 10 | 3,800 | clear |
| 18 | 230 | 90 | 30/0 | 2.7/47.3 | 27 | 10 | 4,500 | clear |
| 19* | 206 | 243 | 30/20 | 0.8/43.2 | 1.8 | 9.8 | 7,000 | slight haze |

*reaction carried out in glass reactor.

EXAMPLE 16

Control C

This control was run to demonstrate the use of a principal initiator and monomer feed such as disclosed in U.S. Pat. No. 3,418,354 and reaction temperatures also disclosed in said patent.

Example 1 was repeated with the exception that the initial charge of poly(oxyalkylene) compound was 450 grams and the reactants were premixed prior to adding to the reactor in the following proportions:
Poly(oxyalkylene): 450 grams
Acrylic Acid: 100 grams
di-t-butylperoxide: 10 grams
The initial charge was heated to 180° C. sparged with nitrogen and then the reactant mixture was fed into the reaction mixture at 180° C. over a period of 60 minutes. The reaction mixture was held at 180° C. with stirring for an additional 15 minutes to complete the reaction Composition #1:
Feed #1 and Feed #2 remained unchanged after storage in the dark or light after 90 hours.

Composition #2:
The feed mixture exhibited no change after 24 hours in the dark but turned into a viscous, hazy liquid containing globs of gel after 90 hours. In the light, the feed mixture began thickening within 16 hours and separated with a white solid gel formed in one of the layers after 90 hours.

Composition #3:

The feed mixture exhibited no change after 90 hours in the dark but turned into a hard, cream-colored solid after 90 hours in the light.

Mixtures of initiator and acrylic acid either in a poly(oxyalkylene) solvent or in neat form exhibited significantly less stability than separate feed compositions on extended storage at ambient conditions.

What is claimed is:

1. A method for preparing graft copolymers of acrylic acid and a poly(oxyalkylene) which comprises adding in separate feed streams from about 3 percent to 15 percent by weight, based on the total weight of poly(oxyalkylene) charged, of acrylic acid and a catalytic amount of t-butyl perbenzoate, di-t-butyl peroxide or t-butyl hydroperoxide to an agitated bath of poly(oxyalkylene) whereby all of said components are intimately admixed at a temperature of about 100° C. to about 160° C. and maintaining said temperature until a graft copolymer of acrylic acid on said poly(oxyalkylene) is obtained which is substantially free of insoluble homopolymerized acrylic acid, said poly(oxyalkylene) having the formula:

$$R''[(OC_nH_{2n})_zOR']_a$$

wherein $R''$ is a hydrocarbon radical containing up to 10 carbons which is free of aliphatic unsaturation and has a valence of a, a is an integer having a value of 1 to 4, $R'$ is a hydrogen atom or a monovalent hydrocarbon radical containing up to 6 carbons which is free of aliphatic unsaturation, n has a value of 2 to 4, inclusive, and z is an integer having a value of about 8 to about 800.

2. The method of claim 1 wherein the poly(oxyalkylene) is derived from a mixture of ethylene oxide and propylene oxide.

3. The method of claim 1 wherein the poly(oxyethylene) is started with a saturated aliphatic alcohol having up to 4 carbons.

4. The method of claim 1 wherein the poly(oxyalkylene) is propylene oxide started with a saturated aliphatic alcohol having up to 4 carbons.

5. The method of claim 1 wherein the separate acrylic acid and/or catalyst-containing reactant feed streams are added in a mixture with the poly(oxyalkylene).

6. Graft copolymer made by the method claimed in claim 1 which is substantially free of insoluble homopolymerized acrylic acid (contains less than 1% by weight of said insoluble homopolymer).

7. A homogeneous graft copolymer of acrylic acid on poly(oxyalkylene) having the formula $$R''[OC_nH_{2n})_zOR']_a$$

wherein $R''$ is a hydrocarbon radical containing up to 10 carbons which is free of aliphatic unsaturation and has a valence of a, a is an integer having a value of 1 to 4, $R'$ is a hydrogen atom or a monovalent hydrocarbon radical containing up to 6 carbons which is free of aliphatic unsaturation, n has a value of 2 to 4, inclusive, and z is an integer having a value of about 8 to about 800, wherein the acrylic acid is in an amount of about 3 to 15 percent by weight based on the total weight of poly(oxyalkylene) and the graft copolymer is substantially free of insoluble homopolymer of acrylic acid (contains less than 1% by weight of said insoluble homopolymer).

8. The graft copolymer of claim 7 wherein the poly(oxyalkylene) is derived from a mixture of ethylene oxide and propylene oxide.

9. The graft copolymer of claim 7 wherein the poly(oxyalkylene) is poly(oxyethylene) started with a saturated aliphatic alcohol having up to 4 carbons.

10. The graft copolymer of claim 7 wherein the poly(oxyalkylene) is poly(oxypropylene) started with a saturated aliphatic alcohol having up to 4 carbons.

11. The graft copolymer of claim 7 wherein the molecular weight (number average) of the poly(oxyalkylene) is in the range of about 1500 to about 4000.

* * * * *